United States Patent
Hu et al.

(10) Patent No.: US 9,542,900 B2
(45) Date of Patent: Jan. 10, 2017

(54) CIRCUIT FOR DETECTING TOUCH POINT LOCATION ON A TOUCH PANEL, TOUCH PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Zuquan Hu, Beijing (CN); Guolei Wang, Beijing (CN); Xiaofang Gu, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 136 days.

(21) Appl. No.: 14/351,699

(22) PCT Filed: May 7, 2013

(86) PCT No.: PCT/CN2013/075269
§ 371 (c)(1),
(2) Date: Apr. 14, 2014

(87) PCT Pub. No.: WO2014/134866
PCT Pub. Date: Sep. 12, 2014

(65) Prior Publication Data
US 2015/0310817 A1    Oct. 29, 2015

(30) Foreign Application Priority Data
Mar. 4, 2013  (CN) .......................... 2013 1 0068061

(51) Int. Cl.
G06F 3/045  (2006.01)
G09G 3/36  (2006.01)
G06F 3/041  (2006.01)

(52) U.S. Cl.
CPC ........... *G09G 3/3648* (2013.01); *G06F 3/0416* (2013.01); *G09G 2310/0202* (2013.01);
(Continued)

(58) Field of Classification Search
CPC .. H03M 1/1019; G01F 23/263; G06K 9/0002; H04N 5/3765; H04N 5/378
See application file for complete search history.

(56) References Cited

U.S. PATENT DOCUMENTS

| | | | |
|---|---|---|---|
| 2004/0140920 A1* | 7/2004 | Ito | H03M 1/1019 341/118 |
| 2011/0074727 A1 | 3/2011 | Kim | |
| 2012/0050220 A1 | 3/2012 | Liu | |

FOREIGN PATENT DOCUMENTS

| | | |
|---|---|---|
| CN | 101706621 A | 5/2010 |
| CN | 101930132 A | 12/2010 |
| CN | 102033348 A | 4/2011 |

OTHER PUBLICATIONS

International Search Report mailed Dec. 12, 2013; PCT/CN2013/075269.

(Continued)

*Primary Examiner* — Kent Chang
*Assistant Examiner* — Gerald Oliver
(74) *Attorney, Agent, or Firm* — Ladas & Parry LLP

(57) ABSTRACT

A circuit for detecting a touch point location on a touch panel, a touch panel and a display device for improving the precision of touch point location on the touch panel are disclosed. The circuit for detecting a touch point location on a touch panel comprises: a sensing sub-circuit, an amplification sub-circuit connected to the sensing sub-circuit, an (Continued)

output sub-circuit connected to the amplification sub-circuit, a detection sub-circuit connected to the output sub-circuit, and a first touch drive electrode line. The sensing sub-circuit comprising a fixed capacitor, a variable capacitor, and a first switch transistor, wherein a gate terminal and a source terminal of the first switch transistor are connected to the first touch drive electrode line, a drain terminal of the first switch transistor is connected to a terminal of the fixed capacitor, a terminal of the variable capacitor is connected to the other terminal of the fixed capacitor, the other terminal of the variable capacitor is connected to a reference voltage, and the amplification sub-circuit is connected to the terminal of the fixed capacitor that is connected to the variable capacitor.

18 Claims, 5 Drawing Sheets

(52) U.S. Cl.
CPC ............... *G09G 2310/0272* (2013.01); *G09G 2310/0289* (2013.01)

(56) References Cited

OTHER PUBLICATIONS

First Chinese Office Action Appln. No. 201310068061.7; Dated Apr. 23, 2015.
Second Chinese Office Action Appln. No. 201310068061.7; Dated Aug. 3, 2015.
International Preliminary Report on Patentability Appln. No. PCT/CN2013/075269; Dated Sep. 8, 2015.
Third Chinese Office Action dated Feb. 19, 2016; Appln. No. 201310068061.7.

\* cited by examiner

CIRCUIT FOR DETECTING TOUCH POINT LOCATION ON A TOUCH PANEL, TOUCH PANEL AND DISPLAY DEVICE

FIELD OF THE ART

The disclosure relates to the field of touch display technology, more particularly, to a circuit for detecting a touch point location on a touch panel, a touch panel and a display device.

BACKGROUND

An in-cell touch panel is formed by integrating a touch panel (TP) as an input medium together with a display panel, and plays an important role in the display technical field. Mutual capacitive TPs are very popular due to their advantages of high sensitivities and multi-touch.

An in-cell touch panel is such a device that the touch drive electrode line and the touch sense electrode line of the touch panel are integrated in the display panel. For example, the touch drive electrode line and the touch sense electrode line are integrated in a Liquid Crystal Display (LCD) or an Organic Light Emitting Device (OLED). The touch drive electrode line and the touch sense electrode line may be fabricated on the front substrate and/or rear substrate of the display panel. To simplify the configuration and reduce the thickness of the in-cell touch panel, the gate line, the common electrode line and other functional electrode lines of the display panel may be used as the touch drive electrode, which is driven in a time division manner to realize image display and touch function.

The basic principle of operation of the mutual capacitive touch panel will be briefly described in the following.

The touch drive electrode of the mutual capacitive touch panel determines X coordinate of the touch point location and the touch sense electrode determines its Y coordinate. A touch drive voltage is applied to the touch drive electrode and a constant voltage is applied to the touch sense electrode. When detecting a touch point location, touch drive electrodes along the X direction are scanned row by row. Signals at individual touch sense electrodes are read when scanning each row of the touch drive electrode. A round of scan can traverse all intersections between each row and each column and totally X*Y signals are scanned. With such a method for detecting the touch point location, coordinates of multiple points may be determined, and thereby realizing multi-touch.

A typical and conventional circuit for detecting a touch point location on a touch panel is illustrated in FIG. 1, which comprises: a sensing sub-circuit 101, an amplification sub-circuit 102, an output sub-circuit 103 and a detection sub-circuit 104. The sensing sub-circuit 101 comprises a fixed capacitor C1, a variable capacitor Cf and a Thin Film Transistor (TFT) M1. The gate and source terminals of the TFT M1 are connected to a touch drive electrode line (such as the gate line Gate(n−1) illustrated in FIG. 1, respectively, which is multiplexed as the touch drive electrode line and the gate line in a time division manner) and a reset voltage line (Vint line), the drain terminal of the TFT M1 is connected to a terminal of the variable capacitor Cf, and the other terminal of the variable capacitor Cf is connected to a reference voltage. A terminal of the fixed capacitor C1 is connected to the gate line Gate(n−1), and the other terminal is connected to the drain terminal of the TFT M1. The amplification sub-circuit 102 comprises a TFT Mamp for amplifying signals. The gate terminal of the TFT Mamp is connected to the drain terminal of the TFT M1, the source terminal is connected to the Vint line, and the drain terminal is connected to the source terminal of a TFT M2 in the output sub-circuit 103. The gate terminal of the TFT M2 is connected to another touch drive electrode line (such as the gate line Gate(n) illustrated in FIG. 1), and the drain terminal is connected to the detection sub-circuit 104 via a Read Out line.

The principle of operation of the circuit for detecting the touch point location on the in-cell touch panel as illustrated in FIG. 1 is as follows: when the Gate(n−1) is at a high level, the TFT M1 is turned on, the fixed capacitor C1 and the variable capacitor Cf are charged, and the drain terminal of the TFT M1 (i.e., node Vc illustrated in FIG. 1) will be charged to Vint (that is, Vc=Vint). When the Gate(n−1) is at a low level, voltage at the node Vc is changed to the following value due to a the capacitance coupling effect:

$$Vc=Vint-C1*\Delta Vp/(C1+Cf) \tag{1}$$

In the above Equation (1), $\Delta Vp$ represents a difference between a high voltage and a low voltage of a linear pulse on the Gate(n−1) line. When a touch occurs, the capacitance of Cf will be changed (generally increased), and thus the voltage at the node Vc is changed. That is, the gate voltage of the amplifying TFT Mamp is changed, the source current of the TFT Mamp is accordingly changed, that is, the source current flowing from the TFT Mamp to the TFT M2 is changed. When Gate(n) is of a high level, the TFT M2 is turned on, and a current flowing from the drain of M2 to the detection sub-circuit 104 via the Read Out Line is changed. The location of the touch point can be accordingly determined by detecting the changed current by the detection sub-circuit 104.

The main disadvantage of the circuit for detecting the touch point location on the in-cell touch panel illustrated in FIG. 1 is as follows: when comparing the value of Vc in Equation (1) computed with the changed Cf caused by the touch with the value of Vc in case of un-touch, the Vc change between the touch and un-touch is not significant and thus the change in the current flowing from the TFT Mamp to the Read Out Line via the TFT M2 is not as significant. As a result, the change of voltage Vout output by the detection sub-circuit 104 is not apparent, so the detection precision of the sub-circuit is low, that is, the precision of touch point location determination is not high. Moreover, since the amplification effect of the amplification sub-circuit 102 in the circuit for detecting the touch point location on the in-cell touch panel illustrated in FIG. 1 is not apparent, the current change amount at Read Out Line is small and the precision of the touch point location is low.

SUMMARY

Embodiments of the invention provide a circuit for detecting a touch point location on a touch panel, a touch panel and a display device, for improving the precision of the touch point location on in-cell touch panels.

A circuit for detecting a touch point location on a touch panel provided by an embodiment of the invention comprises:

a sensing sub-circuit, an amplification sub-circuit connected to the sensing sub-circuit, an output sub-circuit connected to the amplification sub-circuit, a detection sub-circuit connected to the output sub-circuit, and a first touch drive electrode line;

wherein the sensing sub-circuit comprises a fixed capacitor, a variable capacitor, and a first switch transistor;

wherein a gate terminal and a source terminal of the first switch transistor are connected to the first touch drive electrode line, a drain terminal of the first switch transistor is connected to a terminal of the fixed capacitor, a terminal of the variable capacitor is connected to the other terminal of the fixed capacitor, the other terminal of the variable capacitor is connected to a reference voltage, and the amplification sub-circuit is connected to the terminal of the fixed capacitor that is connected to the variable capacitor.

The amplification sub-circuit comprises, for example, a second switch transistor, a third switch transistor, and a amplification transistor;

wherein a gate terminal of the second switch transistor is connected to the terminal of the fixed capacitor that is connected to the first switch transistor, a gate terminal of the third switch transistor is connected to the terminal of the fixed capacitor that is connected to the variable capacitor, a drain terminal of the second switch transistor is connected to a source terminal of the third switch transistor, a source terminal of the second switch transistor is connected to a high level voltage source, a drain terminal of the third switch transistor is connected to a low level voltage source, a gate terminal of the amplification transistor is connected to the drain terminal of the second switch transistor, a drain terminal of the amplification transistor is connected to the output sub-circuit, a source terminal of the amplification transistor is connected to the high level voltage source.

The amplification sub-circuit comprises, for example, an amplification transistor.

Wherein a gate terminal of the amplification transistor is connected to the terminal of the fixed capacitor that is connected to the variable capacitor, a drain terminal of the amplification transistor is connected to the output sub-circuit, a source terminal of the amplification transistor is connected to the high level voltage source.

The detection circuit may further comprises, for example, a second touch drive electrode line, the output sub-circuit comprises a fourth switch transistor. A gate terminal of the fourth switch transistor is connected to the second touch drive electrode line, a source terminal of the fourth switch transistor is connected to the drain terminal of the amplification transistor, and a drain terminal of the fourth switch transistor is connected to the detection sub-circuit.

As an example, the detection sub-circuit comprises an amplifier, a capacitor spanning across an inverse input terminal and the output terminal of the amplifier, and a switch spanning across the inverse input terminal and the output terminal of the amplifier.

As an example, the first touch drive electrode line and the second touch electrode line are gate lines.

As an example, the first switch transistor, the second switch transistor, the third switch transistor, the fourth switch transistor and the amplification transistor are N-type transistors.

An embodiment of the invention further provides a touch panel comprising the above detection circuit.

An embodiment of the invention further provides a display device comprising the above touch panel.

According to the embodiments of the invention, the gate voltage of the film transistor in the amplification sub-circuit is controlled by the fixed capacitor and the variable capacitor connected in series in the sensing sub-circuit. In this way, the change of the voltage Vout, between cases of being touched and un-touched, output by the detection sub-circuit is significant and thereby the precision of touch point location is higher. Moreover, to further improve the precision of touch point location on the touch panel, the amplification sub-circuit provided by the embodiment of the invention is a two-stage amplification circuit, which can further amplify the amount of voltage change caused by touch, and thus enhance the amount of voltage Vout change output by the detection sub-circuit and further improve the precision of touch point location.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

Figure 1:
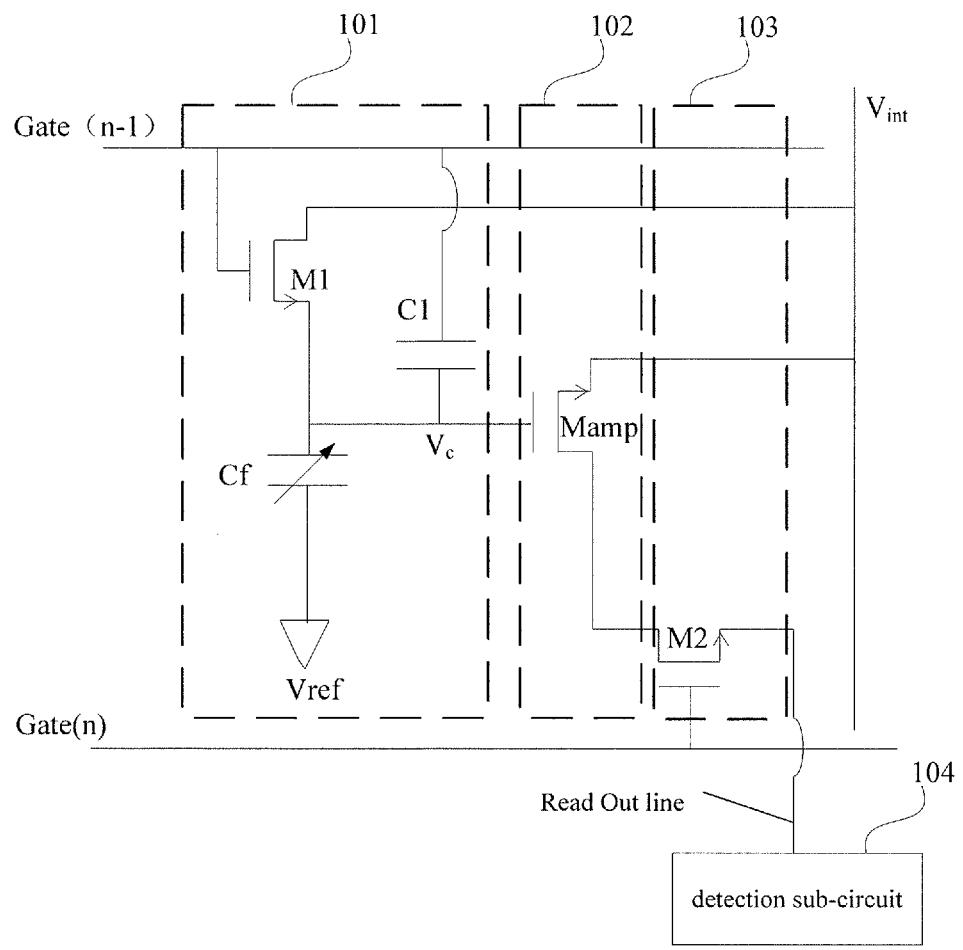
FIG. 1 schematically illustrates a diagram of a prior art circuit for detecting a touch point location on a touch panel.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left"

and the like are only used to indicate relative position relationship, and when the position of the object which is described is changed, the relative position relationship may be changed accordingly.

Embodiments of the invention provide a circuit for detecting a touch point location on a touch panel, a touch panel and a display device, with an aim of improving the precision of the touch point location on the in-cell touch panel.

In the embodiments of the invention, a gate voltage of a TFT Tamp in an amplification sub-circuit connected to a sensing sub-circuit is controlled by a fixed capacitor and a variable capacitor connected in series in the sensing sub-circuit, and thereby the values of voltage Vout when touched and not-touched, output by the detection sub-circuit are significantly different and thus the precision of touch point location is improved. Moreover, to further improve the precision of touch point location on the touch panel, the amplification sub-circuit provided by the embodiment of the invention is a two-stage amplification circuit, which can further amplify the amount of voltage change caused by touch, and thus enhance the amount of voltage Vout change output by the detection sub-circuit and further improve the precision of touch point location.

In the followings, technical solutions provided by the embodiments of the invention will be described in detail with reference to the drawings.

The circuit for detecting the touch point location on the touch panel provided by the embodiment of the invention may be embedded in a LCD panel or in an OLED panel. The touch drive electrode line in the touch panel may be an electrode line disposed independently from or one of the gate line, the data line, the common electrode line and the like; which drives the gate line, the data line, the common electrode line in a time division manner so as to realize image display and the touch function.

In the following, the technique disclosed by the invention will be described in detail with reference to an example of using the gate line as the touch drive electrode line.

Figure 2:
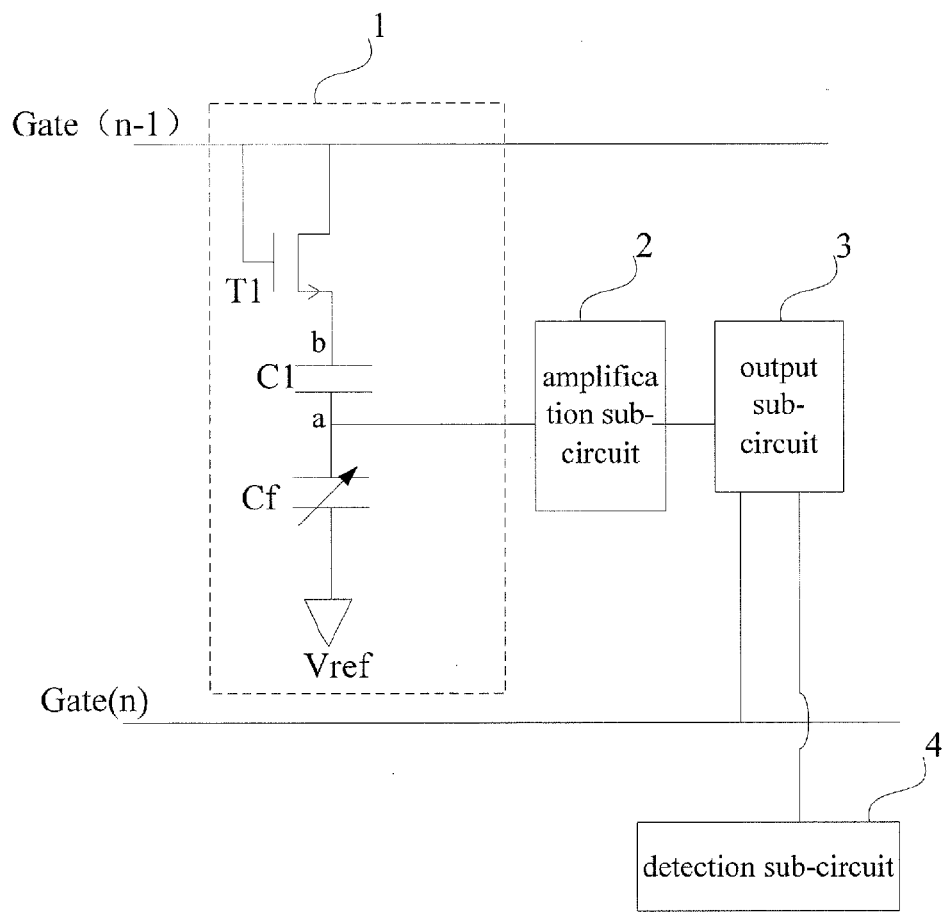
FIG. 2 schematically illustrates a diagram of a circuit for detecting a touch point location on a touch panel in accordance with an embodiment of the invention.

As illustrated in FIG. 2, a circuit for detecting a touch point location on a touch panel provided by an embodiment of the invention comprises:

a sensing sub-circuit 1, an amplification sub-circuit 2, an output sub-circuit 3, a detection sub-circuit 4, as well as a first touch drive electrode line (that is, a first gate line Gate(n−1) in FIG. 2) and a second touch drive electrode line (that is, a first gate line Gate(n) in FIG. 2).

Functions of individual parts of the circuit illustrated in FIG. 2 are respectively as follows. The sensing sub-circuit 1 senses if any touch exists; when a touch occurs, current or voltage signal change (i.e., a touch signal) caused by the touch is amplified by the amplification sub-circuit 2 and then output to the detection sub-circuit 4 via the output sub-circuit 3, the detection sub-circuit 4 detects the touch signal during a detection time period and determines a location of the touch point.

The sensing sub-circuit 1 comprises: a switch transistor T1, a fixed capacitor C1, and a variable capacitor Cf, wherein a gate terminal and a source terminal of the switch transistor T1 are connected to the first gate line Gate(n−1), a drain terminal of the switch transistor T1 is connected to a terminal (terminal b) of the fixed capacitor C1, a terminal of the variable capacitor Cf is connected to the other terminal (terminal a) of the fixed capacitor C1, and the other terminal of the variable capacitor Cf is connected to a reference voltage V.

That is to say, the variable capacitor Cf and the fixed capacitor C1 are connected in series. Capacitance of the variable capacitor Cf may change when a finger touches the touch panel. A voltage at the terminal b of the fixed capacitor C1 corresponds to a node voltage Vb, and a voltage at the terminal a of the fixed capacitor C1 corresponds to a node voltage Va.

The operation procedure of the above sensing sub-circuit 1 will be described in detail hereinafter.

Figure 3:
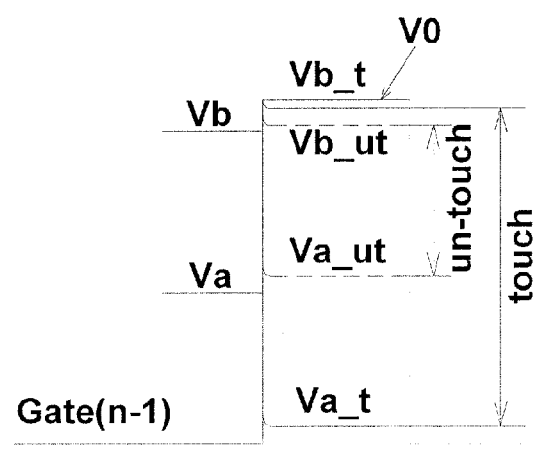
FIG. 3 schematically illustrates a voltage diagram across a capacitor C1 when touched and not touched in the detection circuit illustrated in FIG. 2.

FIG. 3 schematically illustrates a diagram of the node voltages Va and Vb across the capacitor C1 when there is/is not a touch while Gate(n−1) is of a high level.

As illustrated in FIG. 2, when Gate(n−1) is a high level voltage V0, the switch transistor T1 is turned on, the fixed capacitor C1 and the variable capacitor Cf are charged, and the voltage at the node b will be charged to about equal to V0. Since the fixed capacitor C1 and the variable capacitor Cf are connected in series, the variable capacitor Cf can function as a voltage divider. Assuming that Vref=0V, then voltage Va at the node a is expressed in Equation (2):

$$Va = C1 * V0 / (C1 + Cf) \quad (2)$$

As the capacitor Cf is variable, originally, the variable capacitor Cf may be designed to approximately equal to the fixed capacitor C1. For example, it may be designed to be not more than C1, that is, Cf≤C1, when no touch occurs, and when a touch occurs, the capacitance of the variable capacitor Cf will be increased due to the presence of a human finger and the increasing amplitude is much larger than C1 (Cf>>C1). It can be seen from Equation (2) that Va≥V0/2 when no touch occurs and Va<<V0/2 When a touch occurs.

As illustrated in FIG. 3, the node voltages Va and Vb are respectively illustrated as Va_ut and Vb_ut when no touch occurs. When a touch occurs, the node voltages Va and Vb are respectively illustrated as Va_t and Vb_t. It is seen that the node voltage Va is significantly decreased when a touch occurs, while the node voltage Vb is almost unchanged or slightly increased. Therefore, the voltage different between Va and Vb is increased by a large degree in case of touch when comparing with that in case of un-touch. The voltage Vout output by the detection sub-circuit 4 depends on Va and Vb. Before and after the touch, the larger Va changes, the larger Vout changes, and the touch point location detection is more accurate. That is, the precision of touch point location in the in-cell touch panel is improved.

In the following, the schematic diagram of the amplification sub-circuit 2 provided by an embodiment of the invention will be described.

The amplification sub-circuit 2 provided by the embodiment of the invention may have several variants.

Figure 4:
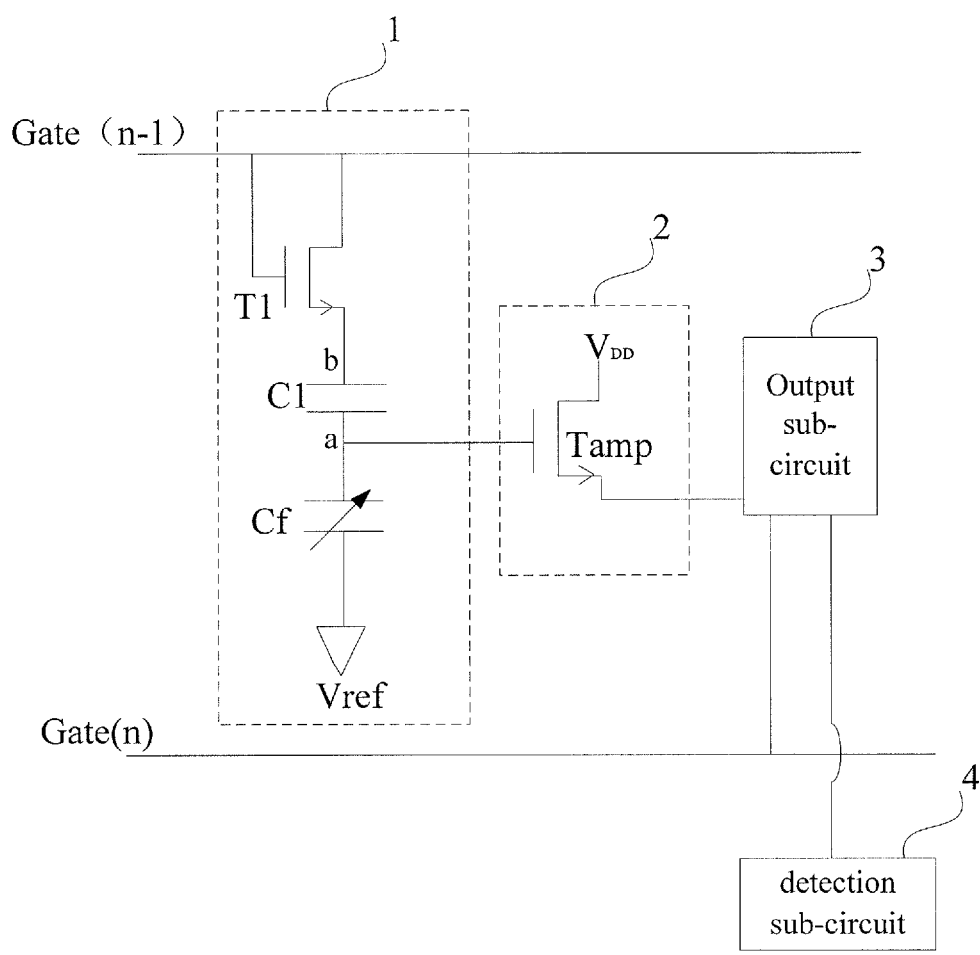
FIG. 4 schematically illustrates a diagram of a circuit for detecting a touch point location on a touch panel in accordance with an embodiment of the invention.

As an example, FIG. 4 schematically illustrates a circuit for detecting a touch point location in a touch panel comprising one type of amplification sub-circuit 2.

The amplification sub-circuit 2 is a one-stage amplification circuit and comprises: an amplification transistor TFT Tamp. A gate terminal of the TFT Tamp is connected to the terminal a of the fixed capacitor C1, and the terminal a has a voltage Va. A source terminal of the TFT Tamp is connected to the high level voltage source which has a voltage VDD, and a drain terminal is connected to the output sub-circuit 3.

In this case, Va=C1*V0/(C1+Cf). Voltage output by the sensing sub-circuit 1 to the TFT Tamp is Va. As the voltage Vb at the node b is almost unchanged, the voltage Vout output by the detection sub-circuit 4 only depends on Va. As Va=C1*V0/(C1+Cf) in the present embodiment of the invention, in comparison with Vc=VintΔC1*ΔVp/(C1+Cf) in prior art as illustrated in FIG. 1, the amount that Va changes is much larger when Cf changes by the same amount. Therefore, the precision of touch point location in the in-cell touch panel is higher.

Figure 5:
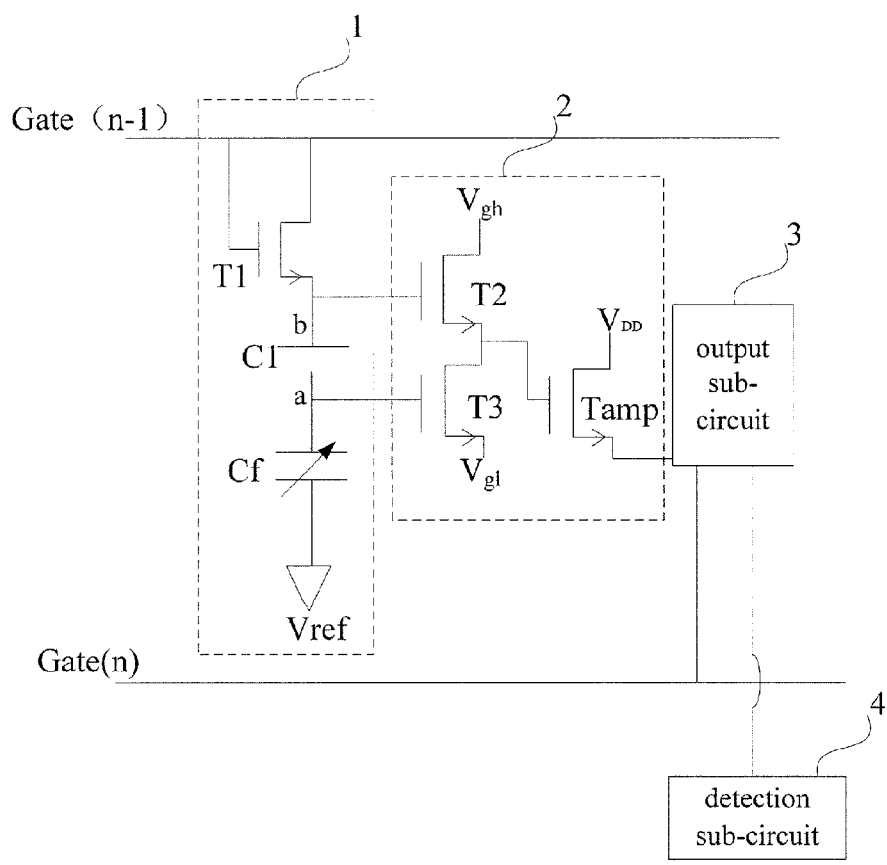
FIG. 5 schematically illustrates a diagram of a circuit for detecting a touch point location on a touch panel in accordance with an embodiment of the invention.

As another example, FIG. 5 schematically illustrates a circuit for detecting a touch point location in a touch panel comprising another type of amplification sub-circuit 2.

Figure 6:
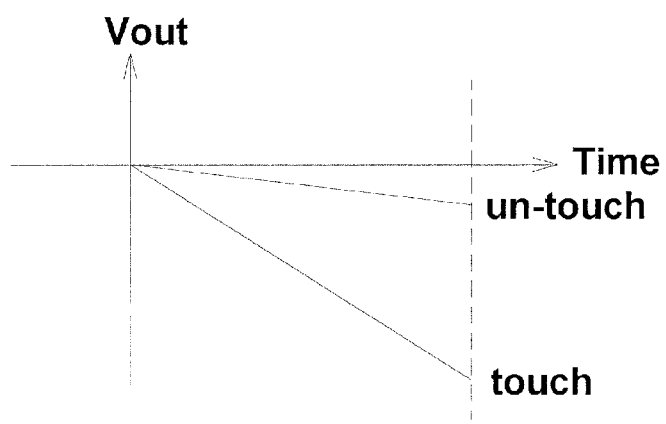
FIG. 6 is a graph illustrating a relationship between the output voltage Vout output by a detection sub-circuit and detection time when touched and untouched according to an embodiment of the invention.

The amplification sub-circuit 2 is a two-stage amplification circuit and comprises: an amplification transistor TFT Tamp, as well as a second switch transistor T2 and a third switch transistor T3, wherein a gate terminal of the second switch transistor T2 is connected to the terminal b of the fixed capacitor C1, a gate terminal of the third switch transistor T3 is connected to the terminal a of the fixed capacitor C1. A drain terminal of the second switch transistor T2 is connected to a source terminal of the third switch transistor T3, and a source terminal of the second switch transistor T2 is connected to a high level voltage source which has a voltage Vgh. A drain terminal of the third switch transistor T3 is connected to a low level voltage source which has a voltage Vgl. A gate terminal of the amplification transistor TFT Tamp is connected between the second switch transistor T2 and the third switch transistor T3, that is, to the drain terminal of the second switch transistor T2 and the source terminal of the third transistor T3. When a touch occurs, Va is significantly decreased, T3 connected to Va is almost turned off, while the increase of Vb further enhances the capacity of switching-ON of T2. Therefore, the TFT Tamp has a larger gate bias voltage (when compared with the amplification sub-circuit of FIG. 4) relative to the case of un-touch. When Gate(n) is of a high level, the TFT Tamp outputs a relatively large current which flows to the detection sub-circuit via the output sub-circuit 3. Within a specific detection time period, the detection sub-circuit 4 can detect a relatively large voltage change corresponding to the relatively large current. FIG. 6 illustrates graphs of the voltage Vout output by the detection sub-circuit 4 versus the detection time in cases of being touched by a finger and untouched.

A circuit illustrated in FIG. 5 can provide an even higher precision of touch point location in comparison with the circuit shown in FIG. 4.

Figure 7:
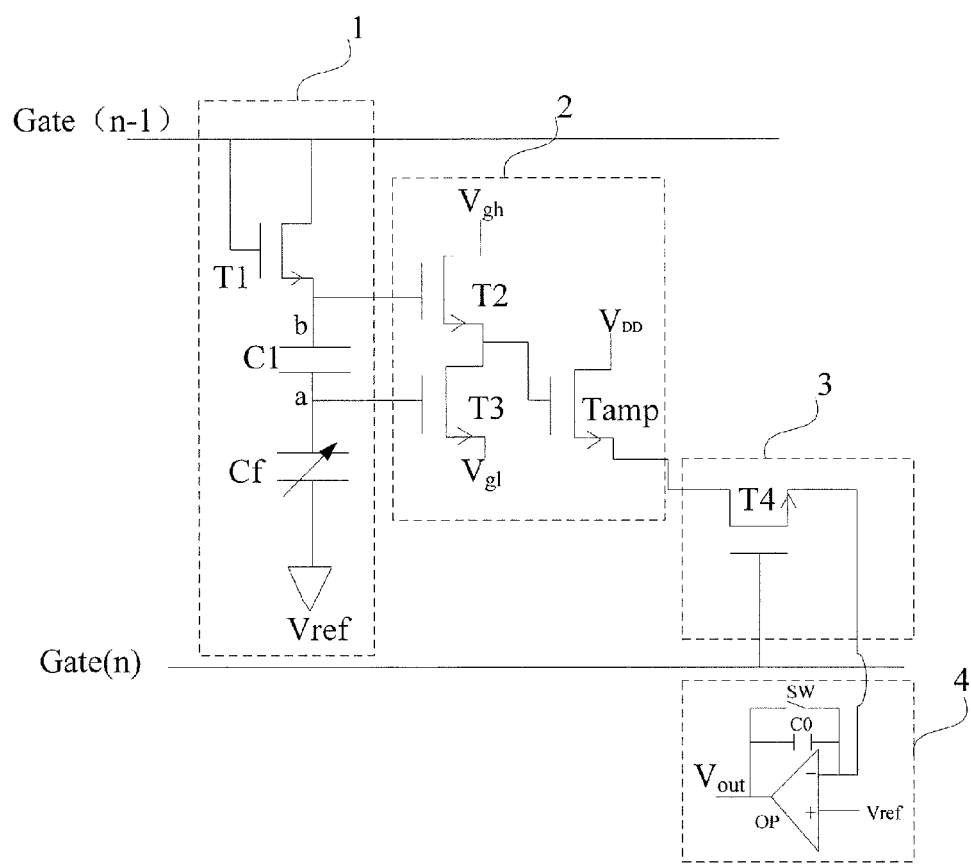
FIG. 7 schematically illustrates a diagram of a circuit for detecting a touch point location on a touch panel in accordance with an embodiment of the invention.

As illustrated in FIG. 7, the output sub-circuit 3 illustrated in FIG. 2 is a switch transistor, that is, the fourth switch transistor T4. A gate terminal of the fourth transistor T4 is connected to the second touch drive electrode line (i.e., the second gate line Gate(n) in FIG. 7), a source terminal is connected to the drain terminal of the TFT Tamp, and the drain terminal is connected to an input terminal of the detection sub-circuit 4.

As illustrated in FIG. 7, the detection sub-circuit 4 illustrated in FIG. 2 comprises an amplifier OP, a capacitor C0 spanning across an inverse input terminal and the output terminal of the amplifier OP, and a switch SW spanning across the inverse input terminal and the output terminal of the amplifier OP.

Individual transistors provided by the embodiment of the invention, such as, the first switch transistor, the second switch transistor, the third switch transistor, the fourth switch transistor and the amplification transistor may be, for example, N-type transistors, gate terminals of which are turned on under a high voltage level. The transistors provided by the embodiment of the invention may be TFTs or transistors of other types.

The invention is described with reference to the example of using the gate line as the touch drive electrode line. When the touch drive electrode line provided by an embodiment of the invention is other functional electrode lines, individual transistors are not limited to N-type transistors, but can also be P-type transistors.

As an example, the reference voltage Vref may be the bias line in the touch panel, that is, an electrode line having a constant voltage. Voltage at that electrode line is VBias.

In the circuit illustrated in FIG. 2, the source terminal and the gate terminal of the first switch transistor T1 are both connected to the first gate line Gate(n−1), without being connected to a further reset voltage line (Vint line). The source terminal of the TFT Tamp is connected to the power source VDD, without being connected to Vint line. Thus, wiring may be simplified and cost is reduced.

An embodiment of the invention provides a touch panel, which is an in-cell touch panel. The touch panel comprises a plurality of circuits for detecting a touch point location on the touch panel provided by the above embodiments of the invention. The number of circuits for detecting touch point locations disposed in the touch panel and distances therebetween may be determined similarly with the prior art, which will not be elaborated here.

An embodiment of the invention further provides a display device, comprising a plurality of touch panels provided by the above embodiments of the invention. The display device may be one of a liquid crystal panel, a LCD, an OLED panel, an OLED device and the like, which have a touch function. In sum, the present invention provides a circuit for detecting a touch point location on a touch panel, a touch panel and a display device, wherein the display device controls the gate voltage of the TFT Tamp in the amplification sub-circuit by connecting the fixed capacitor C1 and the variable capacitor Cf in the sensing sub-circuit in series, so that the voltage Vout output by the detection sub-circuit changes significantly in cases of touch and un-touch, so as to improve the precision of touch point location. Moreover, to further improve the precision of touch point location on the touch panel, the amplification sub-circuit provided by the embodiment of the invention is a two-stage amplification circuit, which further amplifies the amount of voltage change caused by the touch, enhances the amount of voltage Vout change output by the detection sub-circuit, and thus further improves the precision of touch point location.

What are described above is related to the illustrative embodiments of the disclosure only and not limitative to the scope of the disclosure; the scopes of the disclosure are defined by the accompanying claims.

What is claimed is:

1. A circuit for detecting a touch point location on a touch panel, comprising: a sensing sub-circuit, an amplification sub-circuit connected to the sensing sub-circuit, an output sub-circuit connected to the amplification sub-circuit, a detection sub-circuit connected to the output sub-circuit, and a first touch drive electrode line, wherein the sensing sub-circuit comprises a fixed capacitor, a variable capacitor, and a first switch transistor; and wherein a gate terminal and a source terminal of the first switch transistor are connected to the first touch drive electrode line, a drain terminal of the first switch transistor is connected to a terminal of the fixed capacitor, a terminal of the variable capacitor is connected to the other terminal of the fixed capacitor, the other terminal of the variable capacitor is connected to a reference voltage, and the amplification sub-circuit is connected to the terminal of the fixed capacitor that is connected to the variable capacitor, wherein the amplification sub-circuit comprises a second switch transistor, a third switch transistor, and a amplification transistor, a gate terminal of the second switch transistor being connected to the terminal of the fixed capacitor that is connected to the first switch transistor, a gate terminal of the third switch transistor being connected to the terminal of the fixed capacitor that is connected to the variable capacitor, a drain terminal of the second switch transistor being connected to a source terminal of the third switch transistor, a source terminal of the second switch transistor being connected to a high level voltage source, a drain terminal of the third switch transistor being connected to a low level voltage source, a gate terminal of the amplification transistor being connected to the drain terminal of the second switch terminal, a drain terminal of the amplification transistor being connected to the output sub-circuit, and a source terminal of the amplification transistor being connected to the high level voltage source.

2. The circuit of claim 1, wherein the amplification sub-circuit comprises an amplification transistor, a gate terminal of the amplification transistor being connected to the terminal of the fixed capacitor that is connected to the variable capacitor, a drain terminal of the amplification transistor being connected to the output sub-circuit, and a source terminal of the amplification transistor being connected to the high level voltage source.

3. The circuit of claim 2, further comprising a second touch drive electrode line, wherein the output sub-circuit comprises a fourth switch transistor, a gate terminal of the fourth switch transistor being connected to the second touch drive electrode line, a source terminal of the fourth switch transistor being connected to the drain terminal of the amplification transistor, and a drain terminal of the fourth switch transistor being connected to the detection sub-circuit.

4. The circuit of claim 3, wherein the detection sub-circuit comprises an amplifier, a capacitor spanning across an inverse input terminal and an output terminal of the amplifier, and a switch spanning across the inverse input terminal and the output terminal of the amplifier.

5. The circuit of claim 2, wherein the detection sub-circuit comprises an amplifier, a capacitor spanning across an inverse input terminal and an output terminal of the amplifier, and a switch spanning across the inverse input terminal and the output terminal of the amplifier.

6. The circuit of claim 1, further comprising a second touch drive electrode line, wherein the output sub-circuit comprises a fourth switch transistor, a gate terminal of the fourth switch transistor being connected to the second touch drive electrode line, a source terminal of the fourth switch transistor being connected to the drain terminal of the amplification transistor, and a drain terminal of the fourth switch transistor being connected to the detection sub-circuit.

7. The circuit of claim 6, wherein the detection sub-circuit comprises an amplifier, a capacitor spanning across an inverse input terminal and an output terminal of the amplifier, and a switch spanning across the inverse input terminal and the output terminal of the amplifier.

8. The circuit of claim 6, wherein the first touch drive electrode line and the second touch electrode line are gate lines.

9. The circuit of claim 6, wherein the first switch transistor, the second switch transistor, the third switch transistor, the fourth switch transistor and the amplification transistor are N-type transistors.

10. The circuit of claim 1, wherein the detection sub-circuit comprises an amplifier, a capacitor spanning across an inverse input terminal and an output terminal of the amplifier, and a switch spanning across the inverse input terminal and the output terminal of the amplifier.

11. The circuit of claim 10, wherein the first touch drive electrode line and the second touch electrode line are gate lines.

12. The circuit of claim 10, wherein the first switch transistor, the second switch transistor, the third switch transistor, the fourth switch transistor and the amplification transistor are N-type transistors.

13. The circuit of claim 1, wherein the detection sub-circuit comprises an amplifier, a capacitor spanning across an inverse input terminal and an output terminal of the amplifier, and a switch spanning across the inverse input terminal and the output terminal of the amplifier.

14. A touch panel comprising a circuit for detecting a touch point location on a touch panel, the circuit comprising: a sensing sub-circuit, an amplification sub-circuit connected to the sensing sub-circuit, an output sub-circuit connected to the amplification sub-circuit, a detection sub-circuit connected to the output sub-circuit, and a first touch drive electrode line,
wherein the sensing sub-circuit comprises a fixed capacitor, a variable capacitor, and a first switch transistor; and
wherein a gate terminal and a source terminal of the first switch transistor are connected to the first touch drive electrode line, a drain terminal of the first switch transistor is connected to a terminal of the fixed capacitor, a terminal of the variable capacitor is connected to the other terminal of the fixed capacitor, the other terminal of the variable capacitor is connected to a reference voltage, and the amplification sub-circuit is connected to the terminal of the fixed capacitor that is connected to the variable capacitor,
wherein the amplification sub-circuit comprises a second switch transistor, a third switch transistor, and a amplification transistor, a gate terminal of the second switch transistor being connected to the terminal of the fixed capacitor that is connected to the first switch transistor, a gate terminal of the third switch transistor being connected to the terminal of the fixed capacitor that is connected to the variable capacitor, a drain terminal of the second switch transistor being connected to a source terminal of the third switch transistor, a source terminal of the second switch transistor being connected to a high level voltage source, a drain terminal of the third switch transistor being connected to a low level voltage source, a gate terminal of the amplification transistor being connected to the drain terminal of the second switch terminal, a drain terminal of the amplification transistor being connected to the output sub-circuit, and a source terminal of the amplification transistor being connected to the high level voltage source.

15. The touch panel of claim 14, wherein the amplification sub-circuit comprises an amplification transistor, a gate terminal of the amplification transistor being connected to the terminal of the fixed capacitor that is connected to the variable capacitor, a drain terminal of the amplification transistor being connected to the output sub-circuit, and a source terminal of the amplification transistor being connected to the high level voltage source.

16. The touch panel of claim 15, further comprising a second touch drive electrode line, wherein the output sub-circuit comprises a fourth switch transistor, a gate terminal of the fourth switch transistor being connected to the second touch drive electrode line, a source terminal of the fourth switch transistor being connected to the drain terminal of the amplification transistor, and a drain terminal of the fourth switch transistor being connected to the detection sub-circuit.

17. The touch panel of claim 14, further comprising a second touch drive electrode line, wherein the output sub-circuit comprises a fourth switch transistor, a gate terminal of the fourth switch transistor being connected to the second touch drive electrode line, a source terminal of the fourth switch transistor being connected to the drain terminal of the amplification transistor, and a drain terminal of the fourth switch transistor being connected to the detection sub-circuit.

18. A display device comprising a touch panel, wherein the touch panel comprises a circuit for detecting a touch point location on a touch panel, the circuit comprising: a sensing sub-circuit, an amplification sub-circuit connected to the sensing sub-circuit, an output sub-circuit connected to the amplification sub-circuit, a detection sub-circuit connected to the output sub-circuit, and a first touch drive electrode line, wherein the sensing sub-circuit comprises a fixed capacitor, a variable capacitor, and a first switch transistor; and wherein a gate terminal and a source terminal of the first switch transistor are connected to the first touch drive electrode line, a drain terminal of the first switch transistor is connected to a terminal of the fixed capacitor, a terminal of the variable capacitor is connected to the other terminal of the fixed capacitor, the other terminal of the variable capacitor is connected to a reference voltage, and the amplification sub-circuit is connected to the terminal of the fixed capacitor that is connected to the variable capacitor, wherein the amplification sub-circuit comprises a second switch transistor, a third switch transistor, and a amplification transistor, a gate terminal of the second switch transistor being connected to the terminal of the fixed capacitor that is connected to the first switch transistor, a gate terminal of the third switch transistor being connected to the terminal of the fixed capacitor that is connected to the variable capacitor, a drain terminal of the second switch transistor being connected to a source terminal of the third switch transistor, a source terminal of the second switch transistor being connected to a high level voltage source, a drain terminal of the third switch transistor being connected to a low level voltage source, a gate terminal of the amplification transistor being connected to the drain terminal of the second switch terminal, a drain terminal of the amplification transistor being connected to the output sub-circuit, and a source terminal of the amplification transistor being connected to the high level voltage source.

\* \* \* \* \*